United States Patent
Manwaring et al.

(10) Patent No.: US 6,857,660 B2
(45) Date of Patent: Feb. 22, 2005

(54) RADIAL SPRING LOCK-TILT HEAD

(75) Inventors: Marvin V. Manwaring, Clio, MI (US); Melvin Lee Tinnin, Clio, MI (US); Ravindra Jwalapathy, Saginaw, MI (US); Ray Garnet Armstrong, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/356,847

(22) Filed: Feb. 3, 2003

(65) Prior Publication Data

US 2004/0150206 A1 Aug. 5, 2004

(51) Int. Cl.[7] .............................. B62D 1/18; G05G 5/06
(52) U.S. Cl. ............................ 280/775; 74/493; 74/531
(58) Field of Search ............................ 280/775; 74/493, 74/531

(56) References Cited

U.S. PATENT DOCUMENTS

| | | | | |
|---|---|---|---|---|
| 2,183,772 A | * | 12/1939 | Johnson | 74/531 |
| 4,800,774 A | * | 1/1989 | Hagiwara et al. | 74/531 |
| 5,157,826 A | * | 10/1992 | Porter et al. | 29/439 |
| 5,219,045 A | * | 6/1993 | Porter et al. | 74/531 |
| 5,363,716 A | * | 11/1994 | Budzik et al. | 280/775 |
| 5,441,129 A | * | 8/1995 | Porter et al. | 188/67 |
| 5,568,843 A | * | 10/1996 | Porter et al. | 74/531 |
| 5,570,610 A | * | 11/1996 | Cymbal | 74/493 |
| 5,639,177 A | * | 6/1997 | Thomas | 74/493 |
| 5,678,454 A | * | 10/1997 | Cartwright et al. | 74/493 |
| 5,711,189 A | * | 1/1998 | Cartwright et al. | 280/775 |
| 5,813,289 A | * | 9/1998 | Renick et al. | 280/775 |
| 6,035,739 A | * | 3/2000 | Milton | 280/775 |

* cited by examiner

Primary Examiner—Paul N. Dickson
Assistant Examiner—Joselynn Y. Sliteris
(74) Attorney, Agent, or Firm—Michael D. Smith

(57) ABSTRACT

A steering column assembly has a tilt head for rotating a steering column. A spring lock assembly locks the tilt head in any of an infinite number of pivotally adjusted positions and includes a locking bar and a coil spring. The coil spring has coils which are wrapped around and grip the locking bar to lock the tilt head in a selected pivotally adjusted position. A tilt release is provided to release the grip of the coils on the locking bar to enable the tilt head to be pivoted to another pivotally adjusted position.

11 Claims, 4 Drawing Sheets

RADIAL SPRING LOCK-TILT HEAD

BACKGROUND OF THE INVENTION

Typically, the tilt head of a steering column has a pin engagable between the teeth of a shoe to set the tilt head in adjusted position. This arrangement provides for a predetermined number of adjusted positions depending upon the number of teeth in the shoe. Adding more teeth will increase the number of available tilt head positions. However even then, it may not be possible to adjust the tilt head to a position that is exactly right for a driver.

SUMMARY OF THE INVENTION

In accordance with the present invention, the tilt head may be locked in any of an infinite number of pivotally adjusted positions. This is accomplished by a spring lock assembly including a locking bar and a coil spring. The coil spring has coils which are wrapped around and grip the locking bar to lock the tilt head in a selected pivotally adjusted position. A tilt release is provided for releasing the grip of the coils on the locking bar to enable pivoting the tilt head to a different pivotally adjusted position.

Further in accordance with the invention, the tilt release is in the form of a lever engagable with the coil spring. The lever, when pivoted in one direction, is operative to enlarge the coils of the coil spring to release the grip of the coil spring on the locking bar.

In a preferred embodiment of the invention, the spring lock assembly includes two locking bars which are arcuate and have centers of curvature that are coincident with the tilt axis of the tilt head. In this preferred embodiment, two coil springs are provided, one wrapped around one of the locking bars and the other wrapped around the other of the locking bars.

One object of this invention is to provide a steering column assembly with a lock assembly for the tilt head, having the foregoing features and capabilities.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
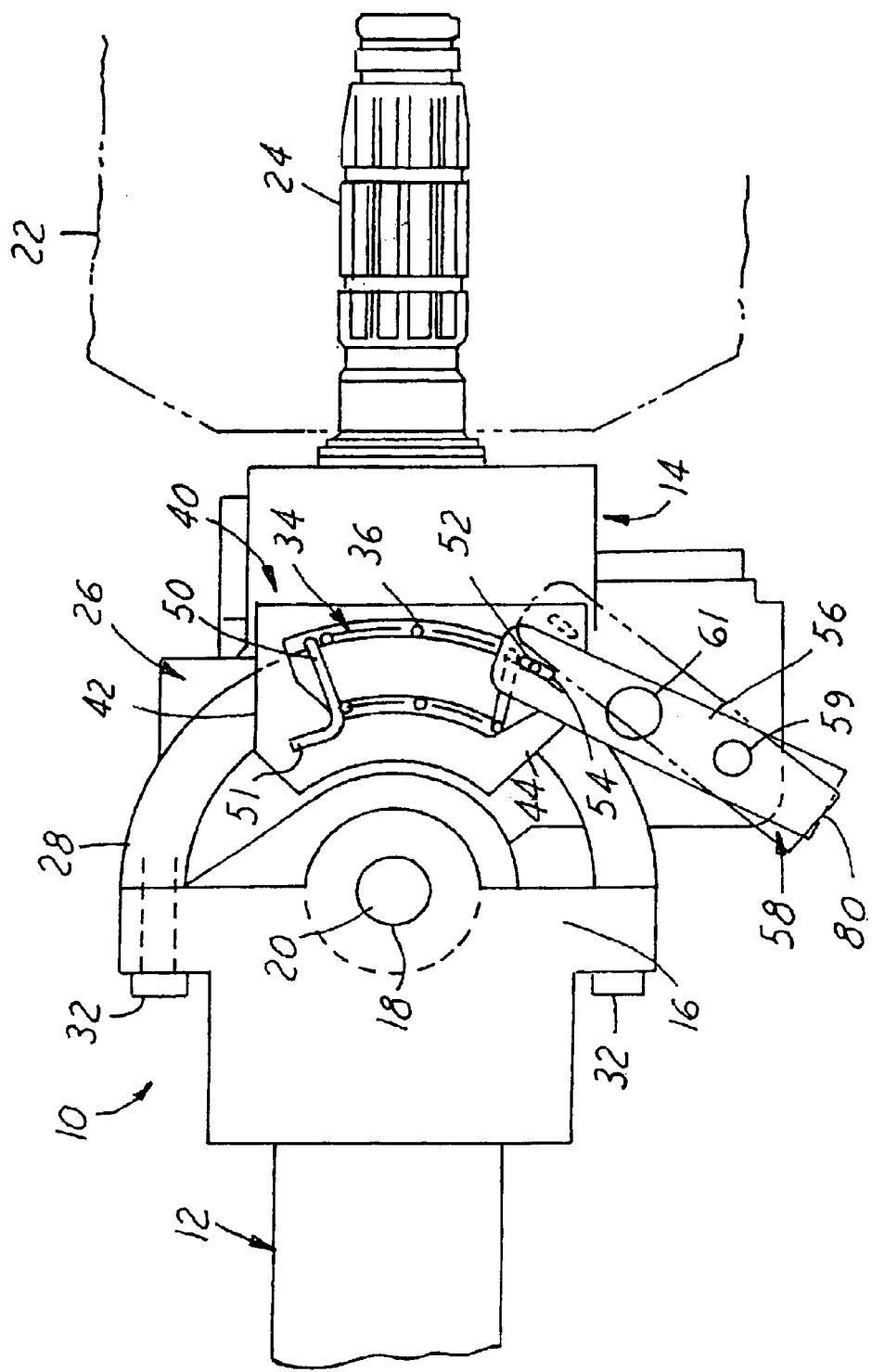
FIG. 1 is a fragmentary elevational view of a steering column having a pivoted tilt head, and a spring lock assembly for locking the tilt head in selected positions of adjustment, constructed in accordance with the invention.
Figure 2:
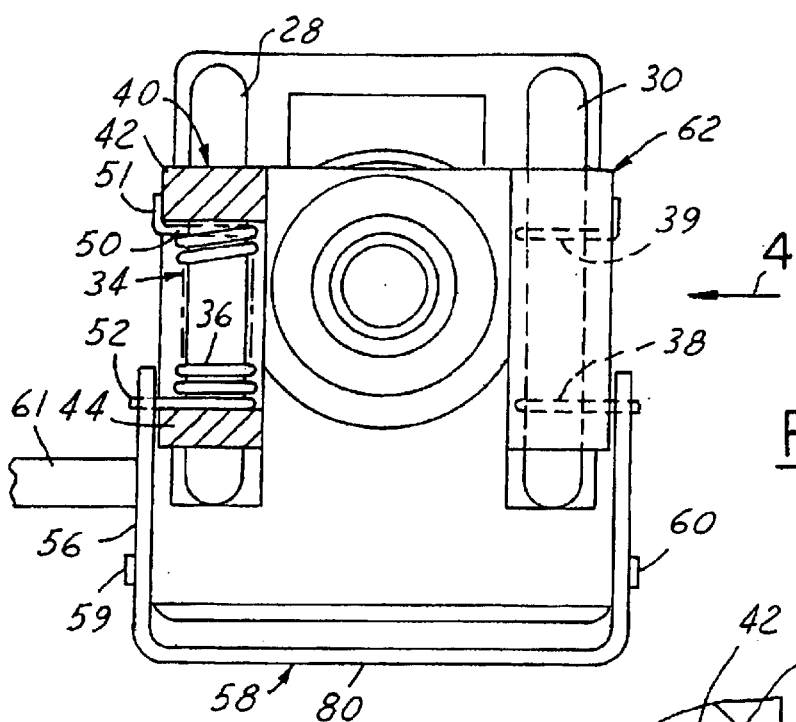
FIG. 2 is an end view of the structure shown in FIG. 1.
Figure 3:
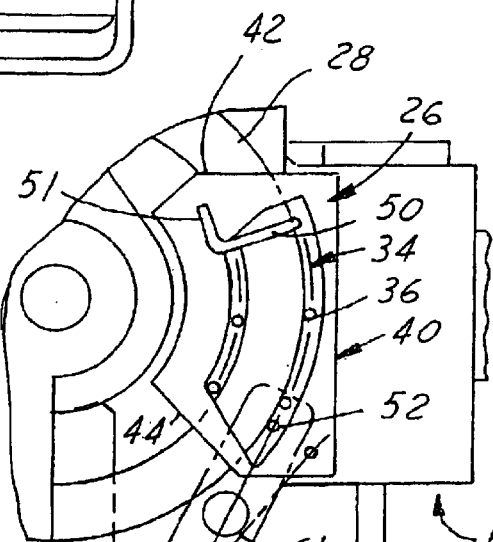
FIG. 3 is a fragmentary view of a portion of FIG. 1 with part of the tilt release lever in broken lines to better illustrate the underlying structure.
Figure 4:
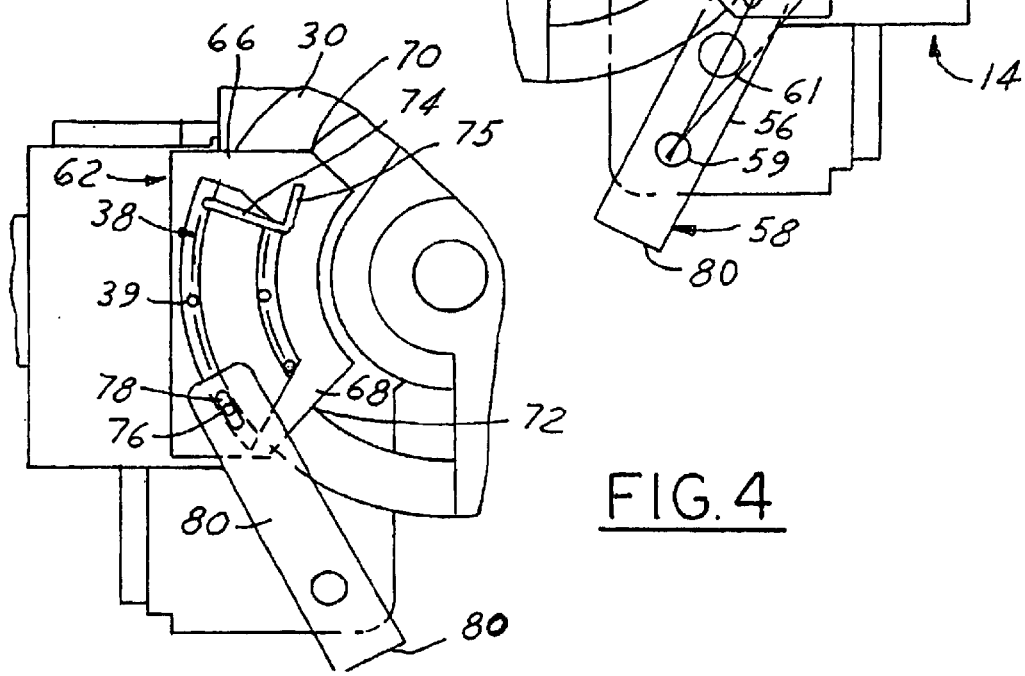
FIG. 4 is a fragmentary view taken in the direction of the arrow 4 in FIG. 2.
Figure 5:
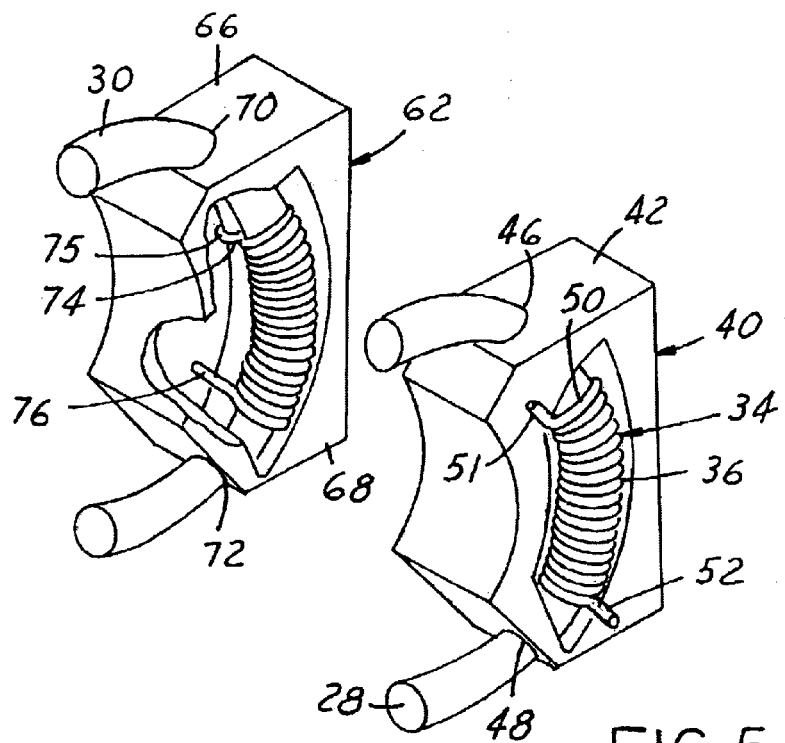
FIG. 5 is a perspective view showing elements of the spring lock assembly which are on opposite sides of the steering column.

Referring now more particularly to the drawings and especially to FIGS. 1–5, there is shown a steering column assembly 10 having an elongated steering column 12 and a tilt head 14. The steering column 12 has a steering column head 16. The tilt head 14 is mounted on the steering column head 16 by a pivot pin 18 for movement about a tilt axis 20 to enable pivotal adjustment of the tilt head. The tilt head 14 includes a steering wheel 22 mounted on a shaft 24 to turn the steering column and thereby steer the vehicle in which the steering column assembly 10 is installed.

A spring lock assembly 26 is provided for locking the tilt head 14 in any of an infinite number of pivotally adjusted positions. The spring lock assembly 26 includes a pair of locking bars 28 and 30 which have their ends secured to the steering column head 16 in laterally spaced apart relation by fasteners 32. The locking bars 28 and 30 are arcuate and each has a center of curvature which coincides with the tilt axis 20 of the tilt head 14.

A coil spring 34 has its coils 36 wrapped around the locking bar 28. A coil spring 38 has its coils 39 wrapped around the locking bar 30.

The coil spring 34 is captured by a bracket 40 secured to one side of the tilt head 14. The bracket 40 is in the form of an open frame having laterally spaced end beams 42 and 44 that are provided with apertures 46 and 48 through which the locking bar 28 extends. One end coil 50 of the coil spring 34 has an end 51 secured to the bracket 40. The opposite end coil 52 projects outwardly from the locking bar 28 through a slot 54 in an arm 56 of a tilt release in the form of an operator or lever 58 that is pivoted to the tilt head 14 by pins 59 and 60. The lever 58 has a handle 61 for pivoting the lever between the solid line position and the broken line position of FIG. 1.

The coil spring 38 is captured by a bracket 62 secured to the opposite side of the tilt head 14. The bracket 62 is in the form of an open frame having laterally spaced end beams 66 and 68 that are provided with apertures 70 and 72 through which the locking bar 30 extends. One end coil 74 of the coil spring 38 has an end 75 secured to the bracket 62. The opposite end coil 76 projects outwardly from the locking bar 30 through a slot 78 in an arm 80 of the lever 58.

The arms 56 and 80 of the lever 58 are laterally spaced apart on opposite sides of the tilt head 14, are parallel to one another, and are interconnected by a cross member 82. The slots 54 and 78 in the arms 56 and 80 are laterally aligned.

Normally, the coils 36 and 39 of the coil springs 34 and 38 tightly grip the locking bars 28 and 30 to lock the tilt head 14 in a selected pivotally adjusted position relative to the steering column 12. When the lever 58 is pivoted in one direction, clockwise in FIG. 1, the arms 56 and 80 of the lever move the end coils 52 and 76 to open or enlarge the coils 36 and 39 of the coil springs 34 and 38 to cause the coil springs to release the locking bars 28 and 30, enabling the tilt head 14 to be pivoted to another pivotally adjusted position.

With the spring lock assembly 26 of this invention, it is possible to minutely and finely adjust the tilt head 14 to an infinite number of positions within a limited range.

Figure 6:
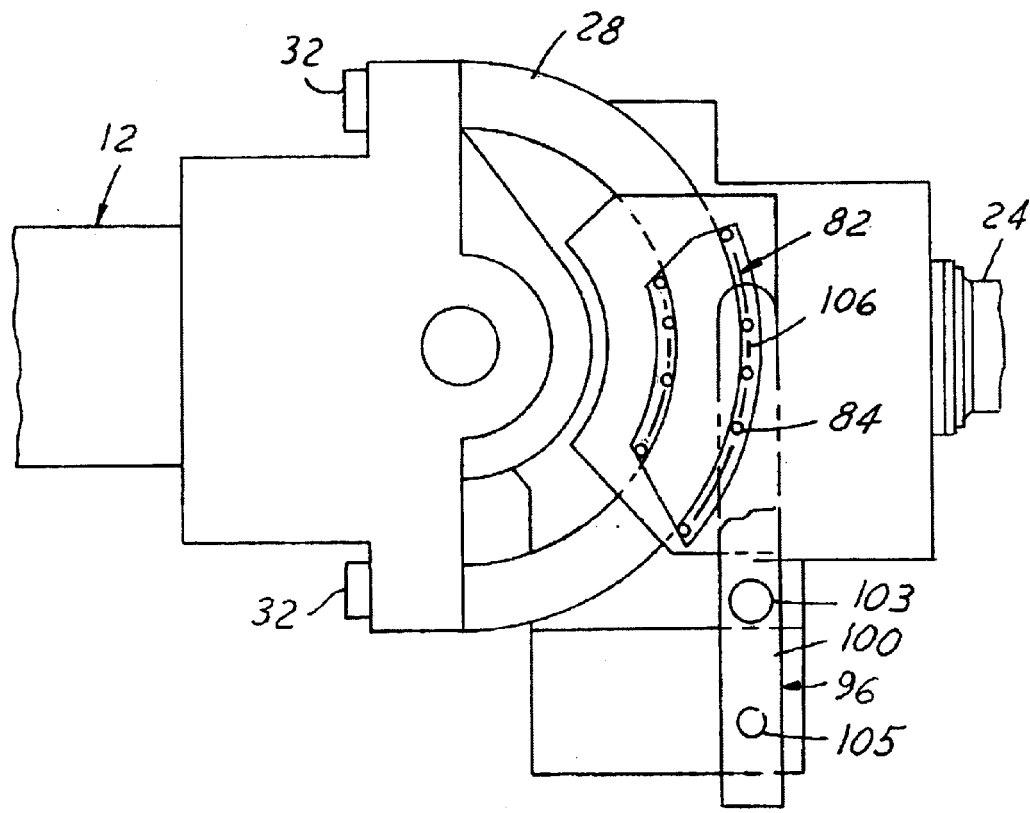
FIG. 6 is a view similar to FIG. 1, but shows a modification.
Figure 7:
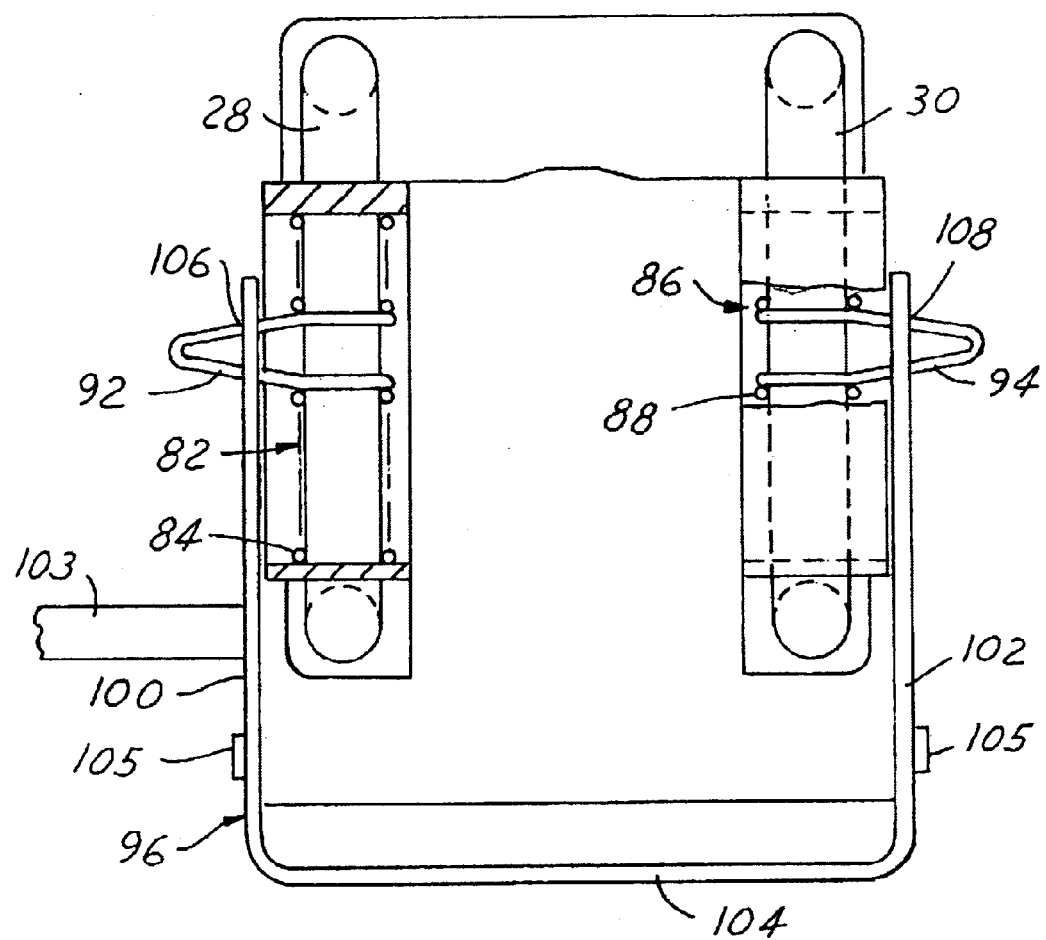
FIG. 7 is an end view of the structure shown in FIG. 6.

FIGS. 6 and 7 show a modification of the invention in which a coil spring 82 has coils 84 wrapped around the locking bar 28, and a coil spring 86 has coils 88 wrapped around the locking bar 30. Both end coils of the coil spring 82 are secured to the bracket 40 and both end coils of the coil spring 86 are secured to the bracket 62. The coil spring 82 has an intermediate coil 92 projecting laterally outwardly from the locking bar 28, and the coil spring 86 has an intermediate coil 94 projecting laterally outwardly from the locking bar 30.

A tilt release in the form of a lever 96 is provided which is like the lever 58 and has laterally spaced arms 100 and 102 on opposite sides of the tilt head 14 which are parallel to one another and are interconnected by a cross member 104. The arms 100 and 102 are pivoted to the tilt head 14 by aligned pins 105. The arms 100 and 102 respectively have slots 106 and 108 which are laterally aligned. The intermediate coil 92 of the coil spring 82 extends through the slot 106 in the arm 100 and the intermediate coil 94 of the coil spring 86 extends through the slot 108 in the arm 102.

Normally, as in the first embodiment, the coils 84 and 88 of the coil springs 82 and 86 tightly grip the locking bars 28 and 30 to lock the tilt head 14 in a selected pivotally adjusted position. When the lever 96 is pivoted in one direction by a handle 103, that is clockwise in FIG. 6, the arms 100 and 102 of the lever move the intermediate coils 92 and 94 to open or enlarge the coils of the coil springs 82 and 86 to release the locking bars 28 and 30, enabling the tilt head 14 to be pivoted to another pivotally adjusted position.

It is to be understood that the invention may be practiced otherwise than as specifically described, and that the scope of the invention is defined by the appended claims.

What is claimed is:

1. A steering column assembly for an automotive vehicle, comprising:
   a steering column having a steering column head,
   a tilt head for rotating said steering column,
   said tilt head having a steering shaft on which a steering wheel is adapted to be mounted,
   said tilt head being pivoted to said steering column head for movement about a tilt axis to enable pivotal adjustment of said tilt head relative to said steering column head, and
   a spring lock assembly for locking said tilt head in any of an infinite number of pivotally adjusted positions,
   said spring lock assembly including a locking bar and a coil spring,
   the coil spring having coils wrapped around and gripping the locking bar to lock the tilt head in a selected pivotally adjusted position,
   a tilt release for releasing the grip of the coils of the coil spring on said locking bar to enable pivoting of said tilt head to another pivotally adjusted position, and
   wherein said locking bar is secured to one of said heads, and said coil spring is captured by a bracket secured on another of said heads.

2. The steering column assembly of claim 1, wherein the tilt release comprises an operator engagable with one of the coils of the coil spring.

3. The steering column assembly of claim 1, wherein the tilt release comprises a lever pivoted to the other of said heads, said lever being engagable with an end of one of the coils of the coil spring.

4. The steering column assembly of claim 1, wherein said locking bar is arcuate and has a center of curvature coincident with the tilt axis of the tilt head.

5. The steering column assembly of claim 4, wherein the tilt release comprises a lever pivoted to the other of said heads, said lever having a slot engagable with an end of one of the coils of the coil spring, said lever, when pivoted in one direction, being operative to effect the release of the grip of the coil spring on the locking bar by enlarging the coils.

6. The steering column assembly of claim 4, wherein the tilt release comprises a lever pivoted to the other of said heads, said lever being engagable with an intermediate one of the coils of the coil spring, said lever, when pivoted in one direction, being operative to effect the release of the grip of the coil spring on the locking bar by enlarging the coils.

7. A steering column assembly for an automotive vehicle, comprising:
   a steering column having a steering column head,
   a tilt head for rotating said steering column,
   said tilt head having a steering shaft on which a steering wheel is adapted to be mounted,
   said tilt head being pivoted to said steering column head for movement about a tilt axis to enable pivotal adjustment of said tilt head relative to said steering column head, and
   a spring lock assembly for locking said tilt head in any of an infinite number of pivotally adjusted positions,
   said spring lock assembly including first and second locking bars secured in laterally spaced apart relation to one of said heads
   a first coil spring having first coils wrapped around said first locking bar,
   a second coil spring having second coils wrapped around said second locking bar,
   the first coils of said first coil spring gripping the first locking bar and the second coils of said second coil spring gripping the second locking bar to lock the tilt head in a selected pivotally adjusted position, and
   a tilt release for simultaneously releasing the grip of the first coils on said first locking bar and the second coils on said second locking bar to enable pivoting of said tilt head to another pivotally adjusted position.

8. The steering column assembly of claim 7, wherein said locking bars are secured to said steering column head, and each of said coil springs is captured by a bracket secured to said tilt head.

9. The steering column assembly of claim 8, wherein each of said locking bars is arcuate and has a center of curvature which is coincident with the tilt axis of the tilt head.

10. The steering column assembly of claim 9, wherein the tilt release comprises a lever pivoted to the steering columnn head, said lever having a first slot engagable with a first end coil of the first coil spring and a second slot engagable with a second end coil of the second coil spring, said lever when pivoted in one direction, being operative to effect release of the grip of the coil springs on the locking bars by enlarging the coils thereof.

11. The steering column assembly of claim 9, wherein the tilt release comprises a lever pivoted to the steering column head, said lever having a first slot engagable with a first intermediate coil of the first coil spring and a second slot engagable with a second intermediate coil of the second coil spring, said lever, when pivoted in one direction, being operative to effect release of the grip of the coil springs on the locking bars by enlarging the coils thereof.

* * * * *